United States Patent

Shackle et al.

(10) Patent No.: US 7,132,803 B2
(45) Date of Patent: Nov. 7, 2006

(54) HIGH EFFICIENCY 4-LAMP INSTANT START BALLAST

(75) Inventors: Peter Shackle, Rolling Hills Estates, CA (US); John Jay Dernovsek, Madison, AL (US); Barrie Drew, Toney, AL (US); Qinghong Yu, Salem, MA (US)

(73) Assignee: Universal Lighting Technologies, Inc., Madison, AL (US)

( * ) Notice: Subject to any disclaimer, the term of this patent is extended or adjusted under 35 U.S.C. 154(b) by 14 days.

(21) Appl. No.: 11/004,605

(22) Filed: Dec. 3, 2004

(65) Prior Publication Data

US 2005/0168164 A1 Aug. 4, 2005

Related U.S. Application Data

(60) Provisional application No. 60/526,641, filed on Dec. 3, 2003.

(51) Int. Cl.
*H05B 37/02* (2006.01)
(52) U.S. Cl. .................. 315/224; 315/291; 315/307
(58) Field of Classification Search ............... 315/291, 315/307, 224, 225, 209 R, DIG. 7, DIG. 5
See application file for complete search history.

(56) References Cited

U.S. PATENT DOCUMENTS

| | | | |
|---|---|---|---|
| 5,436,529 A | 7/1995 | Bobel | 315/106 |
| 5,493,180 A | 2/1996 | Bezdon et al. | 315/106 |
| 5,500,576 A | 3/1996 | Russell et al. | 315/307 |
| 5,636,111 A | 6/1997 | Griffin et al. | 315/225 |
| 5,770,925 A | 6/1998 | Konopka et al. | 315/225 |
| 5,945,788 A | 8/1999 | Li et al. | 315/308 |
| 5,969,483 A | 10/1999 | Li et al. | 315/225 |
| 5,982,106 A | 11/1999 | Bobel | 315/209 R |
| 6,011,358 A * | 1/2000 | Knobloch et al. | 315/224 |
| 6,127,786 A | 10/2000 | Moisin | 315/291 |
| 6,169,369 B1 | 1/2001 | Nerone et al. | 315/106 |
| 6,211,623 B1 | 4/2001 | Wilhelm et al. | 315/224 |
| 6,236,168 B1 * | 5/2001 | Moisin | 315/291 |
| 6,316,887 B1 | 11/2001 | Ribarich et al. | 315/307 |
| 6,362,575 B1 * | 3/2002 | Chang et al. | 315/224 |
| 6,501,225 B1 | 12/2002 | Konopka | 315/106 |
| 6,552,494 B1 | 4/2003 | Randazzo et al. | 315/106 |
| 6,696,798 B1 * | 2/2004 | Nishimoto et al. | 315/224 |

(Continued)

FOREIGN PATENT DOCUMENTS

EP 0061730 6/1982

(Continued)

*Primary Examiner*—Tuyet Vo
*Assistant Examiner*—Ephrem Alemu
(74) *Attorney, Agent, or Firm*—Waddey & Patterson; Mark J. Patterson; Jason L. Hornkohl

(57) ABSTRACT

An instant-start ballast for a multiple gas discharge lamp fixture has a single half-bridge inverter that is used to drive at least two series resonant output circuits. Each series resonant output circuit is used to drive two gas discharge lamps. A single output voltage limiting circuit is provided with a microprocessor that monitors the combined output voltages of the series resonant output circuits and uses a single voltage limiting transistor to control the output voltages of the circuits. A capacitor is associated with each gas discharge lamp socket in the fixture such that a voltage across the capacitor indicates that a lamp has been installed in the socket associated with the capacitor. The ignition sequence will only be initiated if the capacitor voltages indicate that a lamp has been installed in each socket of a fixture.

17 Claims, 3 Drawing Sheets

U.S. PATENT DOCUMENTS

| | | | |
|---|---|---|---|
| 6,963,178 B1 * | 11/2005 | Lev et al. | 315/307 |
| 2002/0105283 A1 | 8/2002 | Murakami et al. | 315/224 |
| 2003/0025464 A1 | 2/2003 | Konopka | 315/291 |

FOREIGN PATENT DOCUMENTS

| | | |
|---|---|---|
| EP | 0576991 | 5/1994 |

* cited by examiner

HIGH EFFICIENCY 4-LAMP INSTANT START BALLAST

CROSS-REFERENCES TO RELATED APPLICATIONS

This application is a Non-Provisional Utility application which claims benefit of U.S. Patent Application Ser. No. 60/526,641 filed Dec. 3, 2003, now abandoned, entitled "High Efficiency 4-Lamp Instant Start Ballast" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

FIELD OF THE INVENTION

The present invention relates generally to the field of ballasts for gas discharge lamps. More particularly, the present invention relates to the development of a highly cost efficient, series-resonant, instant-start ballast that uses a single half-bridge inverter to drive multiple series resonant output circuits which in turn drive multiple gas discharge lamps.

BACKGROUND OF THE INVENTION

An electronic ballast for a gas discharge, fluorescent or high-intensity discharge lamp provides the current, voltage, and wave-form conditions needed to operate the lamp. An instant-start ballast is a ballast that is designed to instantly start a gas discharge lamp such as a fluorescent lamp by applying a high voltage across the lamp without preheating the cathode. Prior art instant-start ballasts, like that shown in U.S. Pat. No. 5,925,990, have been in use for some time. In these prior art instant-start ballasts, it has been necessary to provide a relatively high output voltage to start the gas discharge lamps. In addition, the high output voltage needs to be maintained for an extended period of time, usually on the order of milliseconds, at a constant and well controlled value to ignite the lamps. In the case of the ballast of the '990 patent, the high start-up output voltage is sensed by placing a series resistor in series with a resonant capacitor. The start-up voltage is typically limited by a fast feedback loop and sensed for amplitude by rectifying it with a diode, smoothing it with a capacitor, and applying it to a sensing node of microprocessor.

Multiple lamp ballasts have been designed that provide power to two or more gas discharge lamps. These multiple lamp ballasts are configured to provide each one of the lamps coupled to the ballasts with the proper operating current and voltage. For example, the above described instant-start ballast configuration has been adapted for use with a four-lamp ballast as set forth in the prior art circuit shown in FIG. 1. In such a circuit, a single ballast 2 essentially drives two complete output stages 4 and 6 of the kind previously described above, with each output stage 4 and 6 providing output terminals 8 and 10 for two respective lamps. A transistor 12 is used to invert the signal from the microprocessor 3 for one of the output stages 4 and 6.

Inverting the signal for one of the output stages 4 and 6 reduces the ripple current stress on the bulk capacitors 14 and 16 by causing the two output stages 4 and 6 to run out of phase. This prior art system works but has the disadvantage of being relatively expensive. The added expense is a result of the need to use two half-bridge drivers 18 and 20 and four output FETS 22, 24, 26 and 28, along with two voltage limiting circuits 30 and 32. The increased number of components used in such a prior art circuit also decreases the reliability of the circuit.

Relatively high output T5 lamps are gradually replacing older T8 lamps in mainstream office ceiling applications. The most efficient way of driving these lamps is using instant-start technology. However, because of the high lamp voltage and high lamp current of these lamps, the conventional parallel resonant, instant-start circuits for such are very inefficient and expensive to make. For the greatest efficiency, series-resonant, direct coupled ballasts are preferred. However, these types of ballasts have problems in meeting the UL through lamp leakage requirements.

In view of the above described deficiencies in the prior art, what is needed is a more cost effective and efficient method and circuit for implementing an instant-start, four-lamp ballast that uses fewer components than prior art ballasts.

BRIEF SUMMARY OF THE INVENTION

A preferred embodiment of the present invention is directed toward an instant-start electronic ballast for igniting and driving four gas discharge lamps. The electronic ballast includes a pair of power input terminals for receiving a power supply voltage. A single inverter circuit receives the power supply voltage and produces an AC output voltage. The inverter circuit is most preferably a half-bridge inverter that includes a pair of series connected MOSFETs having a common connection point that supplies an AC voltage to each of two series resonant output circuits. The two series resonant output circuits each receive the output AC voltage from the single inverter circuit and provide a drive voltage to a pair of gas discharge lamp terminals associated with each resonant output circuit. Most preferably, each one of the two resonant output circuits is configured to drive at least two gas discharge lamps. Each resonant output circuit also includes a capacitor. A microprocessor circuit connected to the inverter circuit and the two resonant output circuits monitors a voltage across the capacitor in each of the resonant output circuits and generates inverter control signals that cause the inverter circuit to attempt to ignite the lamps connected to the resonant output circuits only when the monitored voltages across the capacitors indicate that lamps are connected to the resonant output circuits. A resistor is also included that receives and combines an output voltage signal from each of the two resonant output circuits. The combined signal is used to control an output voltage value of the electronic ballast. Alternatively, the resistor may be replaced with a pair of resistors connected in parallel.

Yet another embodiment of the present invention is directed toward a method of driving a plurality of gas discharge lamps. In accordance with the method, an input power supply voltage is received from a power supply circuit with a single inverter circuit that is preferably a half-bridge inverter. An AC output voltage is produced with the single inverter circuit. The AC output voltage generated by the single inverter circuit is provided to at least two resonant output circuits wherein each of the respective resonant output circuits produces a lamp output voltage on at least one pair of lamp output terminals. Each resonant output circuit preferably includes at least one capacitor and a voltage across each of the at least one capacitors is monitored. An ignition signal is not produced on the lamp output terminals unless a voltage is detected across both of the capacitors that indicates a gas discharge lamp is connected to each of the lamp output terminals of the resonant output circuits. An output voltage signal from each of the two resonant output circuits is combined and the combined voltage output signal is used to control the output AC voltage value for the lamp output terminals.

Yet another embodiment of the present invention is directed toward an instant-start ballast for driving a plurality of gas discharge lamps. The instant start ballast includes an inverter circuit for producing an AC signal from a received DC signal. A first resonant tank circuit receives the AC signal from the inverter circuit and produces a first output voltage. A second resonant tank circuit receives the AC signal from the inverter circuit and produces a second output voltage. The first and the second resonant tank circuits each include a series connection of a tank inductor and a tank capacitor. A resistor combines the first and the second output voltages and a microprocessor is used to monitor the combined voltage and control the first output voltage and the second output voltage based upon the monitored voltage. Each resonant tank circuit also preferably includes a tank capacitor wherein a voltage across each tank capacitor is monitored to determine if a lamp is connected to the outputs of both the first tank resonant circuit and the second tank resonant circuit. An ignition signal is produced by the ballast only if the monitored voltage indicates that a lamp is connected to both the first and the second tank resonant circuits. Each resonant tank circuit is preferably configured to drive at least two gas discharge lamps.

DETAILED DESCRIPTION OF THE INVENTION

Figure 2:
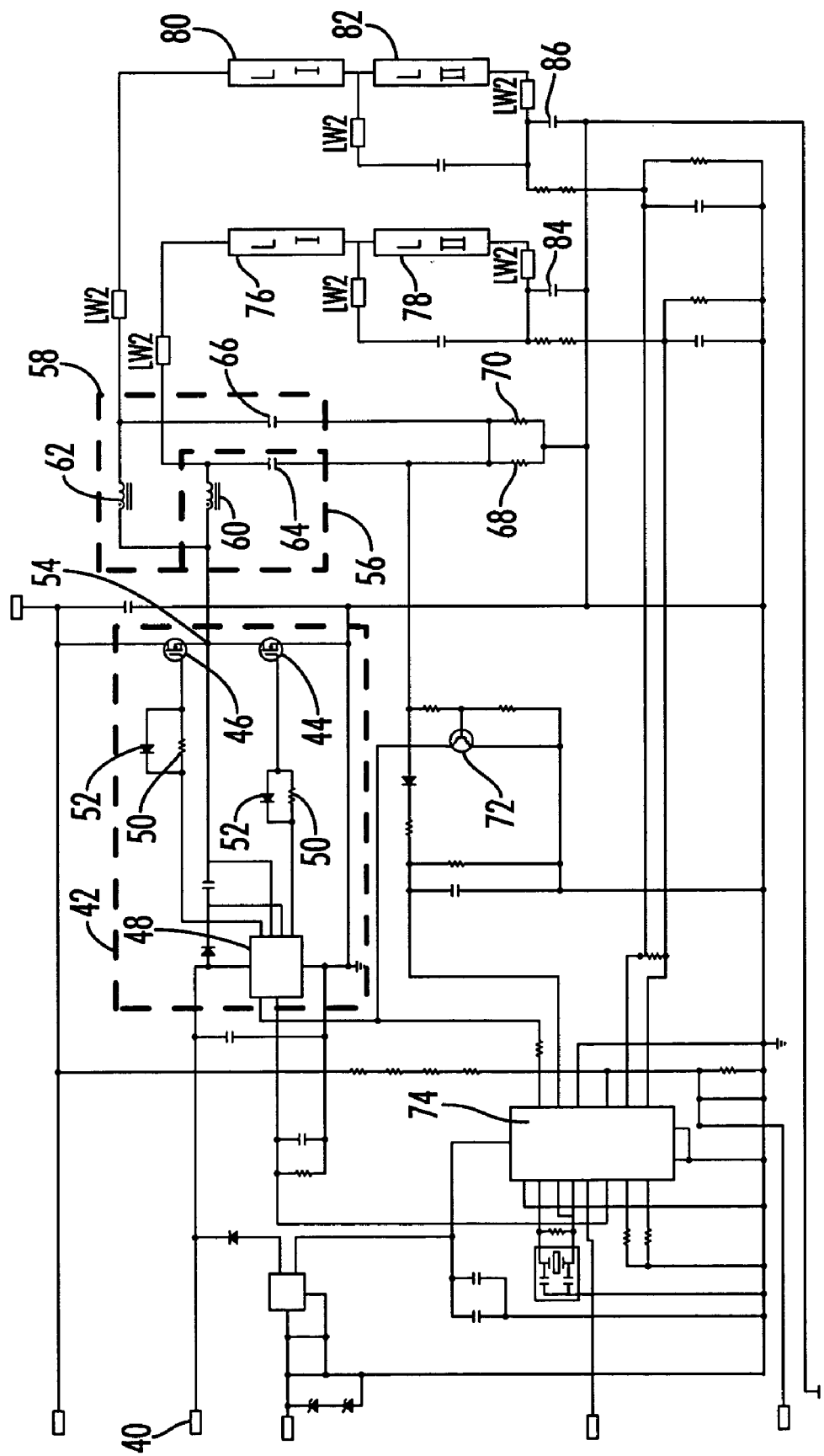
FIG. 2 is a schematic of a preferred embodiment of the present invention for driving four gas discharge lamps.

The present invention overcomes the aforementioned deficiencies in the prior art by providing an instant-start ballast for driving multiple gas discharge lights that has less components and, thus, is less expensive and more reliable than prior art designs. More particularly, a preferred embodiment of the present invention for implementing an instant-start, four-lamp ballast is shown in FIG. 2. The ballast receives an input DC voltage on line 40 with a single half-bridge inverter 42. Typically, the DC voltage would be received from a bridge rectifier that has rectified a standard AC power signal. The DC voltage on line 40 is provided to a single half-bridge inverter 42 that converts the DC voltage into a relatively high frequency AC voltage.

The single half-bridge inverter 42 includes a pair of series connected MOSFETs 44 and 46 having their gates connected to an integrated circuit driver 48 through a parallel connection of a resistor 50 and diode 52. The common terminal 54 of the MOSFETS 44 and 46 is used to drive a pair of series resonant tanks 56 and 58, as shown in FIG. 2, wherein each series resonant tank 56 and 58 is comprised of a respective inductor 60 or 62 and a capacitor 64 or 66. Thus, the single half-bridge inverter 42 drives both the resonant tank 56 that includes inductor 60 and capacitor 64 and the resonant tank 58 that includes inductor 62 and capacitor 66. As previously discussed, the elimination of the need for two half-bridge inverters is very beneficial in that its decreases the cost of the circuit while simultaneously increasing its reliability by reducing the number of circuit components needed to implement the ballast.

An output voltage limiting circuit for the ballast of the present invention is constructed from a first 68 and second 70 parallel connected resistor that drive a voltage limiting transistor 72. The voltage across resistors 68 and 70 is provided to a sensing pin of the microprocessor 74 and to the base of the voltage limiting transistor 72. The voltage across the first 68 and second 70 resistors is monitored by the microprocessor 74 to determine whether or not lamps are installed in the four sockets 76, 78, 80 and 82. The transistor 72 functions to control the output voltage provided to the lamps 76, 78, 80 and 82 by decreasing the voltage provided to the integrated circuit driver 48 in response to a detected output voltage. By combining the output voltages from the series-resonant output circuits 56 and 58, the embodiment of FIG. 2 eliminates the need for two voltage control circuits such as were used in the prior art circuit of FIG. 1. At first glance, it might appear that if one of the series-resonant output circuits 56 or 58 was producing a high output voltage, the voltage limiting circuit would cause transistor 72 to lower the output voltage to such an extent that the other resonant output circuit 56 or 58 would be prevented from producing an ignition voltage. However, provided the output voltage limit is kept much higher (2000V peak vs. 1200V peak) than the voltage needed to strike the lamps, this reducing of the output voltage will not prevent the lamps 76, 78, 80 and 82 from igniting and, thus, does not pose a significant problem. In an alternative embodiment, the resistors 68 and 70 in the circuit of FIG. 2 are replaced with a series resistor and a capacitor which reduces the significant power dissipation that may appear in resistors 68 and 70.

The presence of a lamp 76, 78, 80 and 82 is detected with a through lamp leakage test wherein the voltage on capacitors 84 and 86 is separately monitored on two pins of the microprocessor 74. The ballast first generates a very brief (800 usec) pulse of high voltage. If lamps 76, 78, 80 and 82 are installed, then some charge will be detected on capacitors 84 and 86. Only if charge is detected on both capacitors 84 and 86 does the microprocessor 74 proceed with the ignition sequence. In this way, the ballast does not put out any potentially dangerous signals unless it has already been determined that the lamps 76, 78, 80 and 82 are properly fastened in their respective fixtures. This insures that the ballast assembly meets the UL through lamp leakage requirements.

Figure 1:
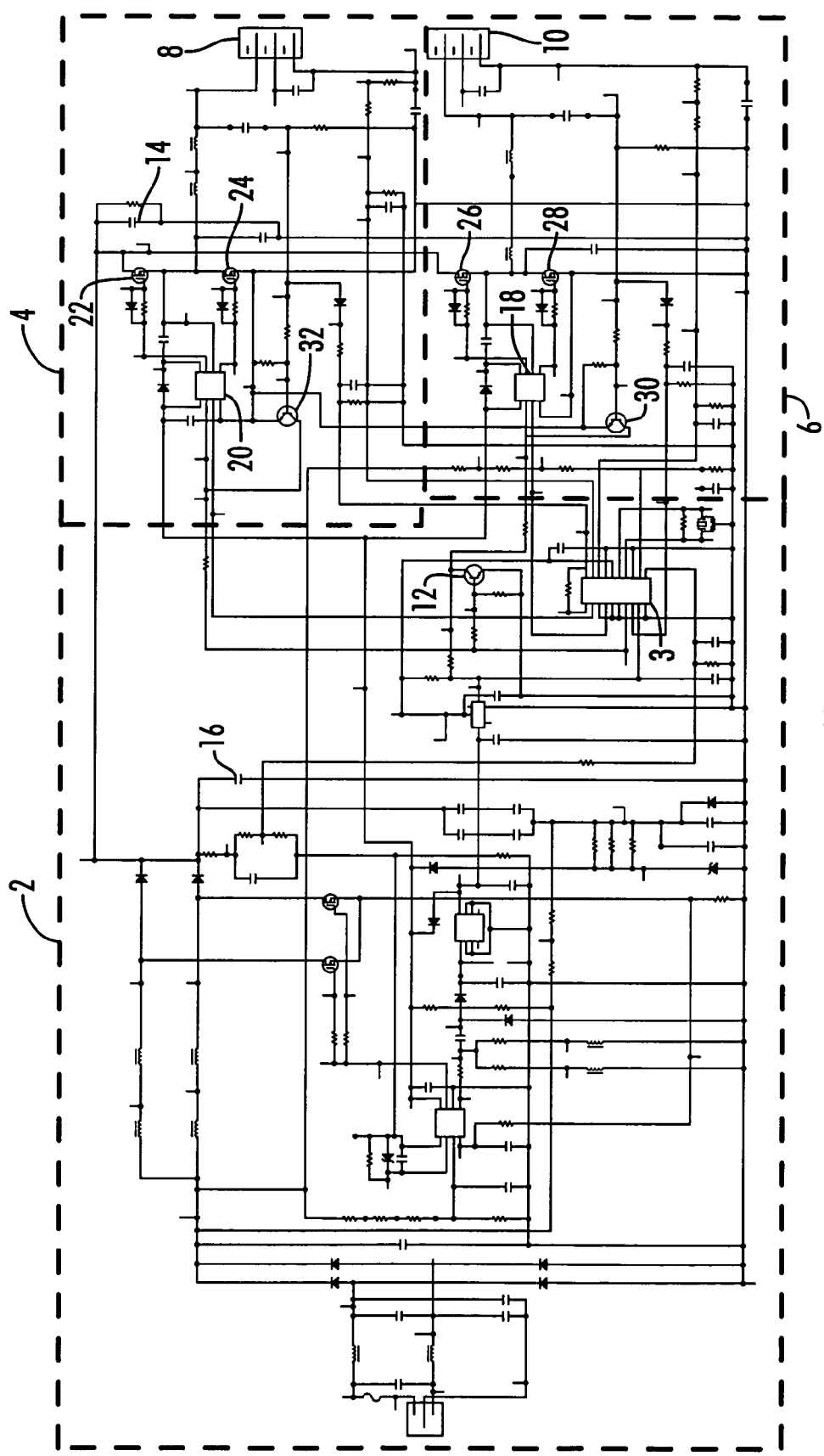
FIG. 1 is a schematic of a prior art instant-start, four-lamp ballast.

The preferred embodiment of the circuit of the present invention as set forth in FIG. 2 significantly differs from the prior art circuit of FIG. 1 in that only one half-bridge inverter 42 is used for both resonant circuits 56 and 58 instead of each resonant circuit 56 and 58 having its own associated half-bridge inverter 42. Furthermore, as described above, another novel feature of the preferred embodiment of the present invention is the monitoring of the two half-bridge inverter capacitors 84 and 86 of the two resonant tanks 56 and 58 running off of the single half-bridge inverter 42. The ignition sequence for the gas discharge lamps 76, 78, 80 and 82 is not performed unless test signals applied to the outputs of the resonant circuits 56 and 58 have produced charge in both of the half-bridge capacitors 84 and 86. If no charge is present on the capacitors 84 and 86, it can be inferred that at least one lamp 76, 78, 80 and 82 has not been properly installed in its associated fixture. Monitoring the charge on the capacitors 84 and 86 allows the ballast to insure that all of the gas discharge lamps 76, 78, 80 and 82 are present prior to performing the ignition sequence. This is important in that the ignition sequence often involves the production of high, potentially dangerous voltages.

A second novel feature of the present invention is the combining of the output voltage signals of the two output circuits 56 and 58 or channels with a single resistance, which is provided in the embodiment of FIG. 2 by parallel connected resistors 68 and 70, and to use this combined signal to control the output voltage of the system. This eliminates the need for two voltage monitoring circuits and, thus, further decreases the costs and increases the reliability of the gas discharge lamp ballast.

Figure 3:
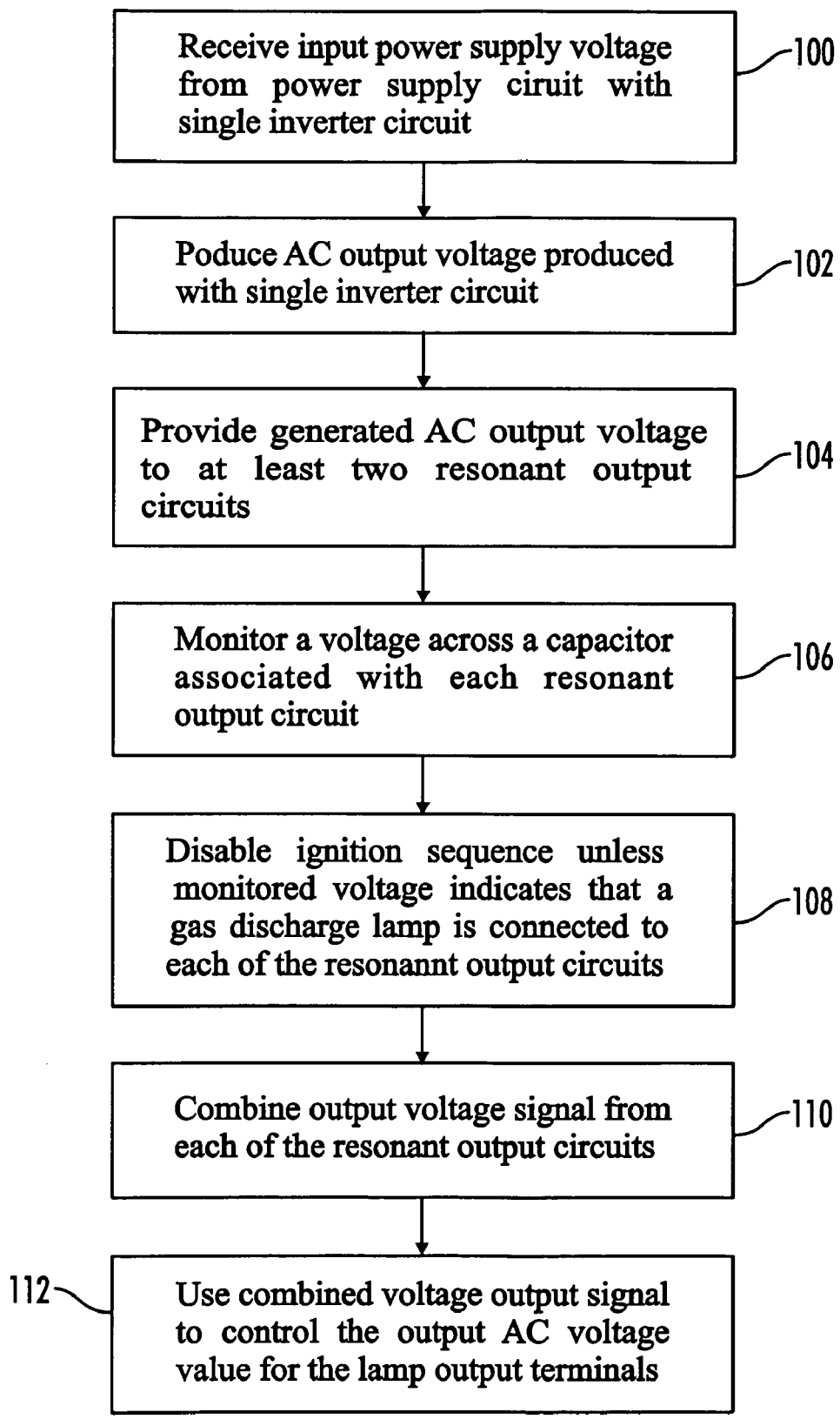
FIG. 3 is a flow chart of a preferred method for driving a gas discharge lamp in accordance with the present invention.

Referring now to FIG. 3, a preferred method for driving a plurality of gas discharge lamps in accordance with an embodiment of the present invention is shown. The method commences in step 100 with the receiving of an input power supply voltage from a power supply circuit with a single inverter circuit. An AC output voltage is then produced with the single inverter circuit in step 102. In step 104 of the preferred method, the AC output voltage generated by the single inverter circuit is provided to at least two resonant output circuits. Preferably, each of the respective resonant output circuits produces a lamp output voltage on at least one pair of lamp output terminals. The inverter is preferably a half-bridge inverter and the resonant output circuits are preferably series resonant output circuits. In step 106, a voltage across a capacitor associated with each resonant output circuit is monitored and, in step 108, an ignition signal is not produced on the lamp output terminals unless the monitored voltage indicates that a gas discharge lamp is connected to each of the lamp output terminals of the resonant output circuits. An output voltage signal from each of the two resonant output circuits is combined in step 110 and the combined voltage output signal is used to control the output AC voltage value for the lamp output terminals in step 112.

As described in detail above, the use of a single inverter and the monitoring of the combined output voltage decreases the number of circuit components needed to implement an instant-start ballast for a multiple gas discharge lamp fixture. Thus, the preferred method of implementing the present invention decreases the cost of implementing such a ballast while increasing its reliability.

Although there have been described particular embodiments of the present invention of a new and useful HIGH EFFICIENCY 4-LAMP INSTANT START BALLAST, it is not intended that such references be construed as limitations upon the scope of this invention except as set forth in the following claims.

What is claimed is:

1. An electronic ballast for igniting and driving at least two gas discharge lamps, comprising:
   a pair of power input terminals for receiving a power supply voltage;
   a single inverter circuit for receiving said power supply voltage and producing an AC output voltage;
   two resonant output circuits wherein each resonant output circuit receives the output AC voltage from the single inverter circuit and provides a drive voltage to a pair of gas discharge lamp terminals associated with the resonant output circuit and wherein each resonant output circuit includes a capacitor; and
   a microprocessor circuit connected to the inverter circuit and the two resonant output circuits for monitoring a voltage across the capacitor in each of the resonant output circuits and for generating inverter control signals that cause the inverter circuit to attempt to ignite lamps connected to the resonant output circuits only when the voltages across the capacitors indicate that lamps are connected to the resonant output circuits.

2. The electronic ballast of claim 1 wherein said inverter circuit is a half-bridge inverter.

3. The electronic ballast of claim 1 wherein said two resonant output circuits are series resonant output circuits.

4. The electronic ballast of claim 1 wherein each one of the two resonant output circuits is configured to drive at least two gas discharge lamps.

5. The electronic ballast of claim 1 wherein the single inverter comprises a pair of series connected MOSFETs having a common connection point that supplies an AC voltage to each of the two resonant output circuits.

6. The electronic ballast of claim 1 further comprising a resistor for receiving and combining output voltage signals from each of the two resonant output circuits wherein the combined output voltage signals are used to control an output voltage value of said electronic ballast.

7. The electronic ballast of claim 6 wherein said resistor further comprises a pair of resistors connected in parallel.

8. A method of driving a plurality of gas discharge lamps, comprising:
   receiving an input power supply voltage from a power supply circuit with a single inverter circuit;
   producing an AC output voltage with said single inverter circuit;
   providing said AC output voltage generated by said single inverter circuit to at least two resonant output circuits wherein each of said respective resonant output circuits produces a lamp output voltage on at least one pair of lamp output terminals; and
   combining an output voltage signal from each of the two resonant output circuits and using this combined voltage output signal to control said AC output voltage for said lamp output terminals.

9. The method of claim 8 wherein said resonant output circuits comprise series resonant output circuits.

10. The method of claim 8 wherein each resonant output circuit comprises at least one capacitor, said method further comprising the step of monitoring a voltage across each of said at least one capacitors and not producing an ignition signal on said lamp output terminals unless a voltage is detected across both of said capacitors that indicates a gas discharge lamp is connected to each of said lamp output terminals of said resonant output circuits.

11. The method of claim 8 wherein said single inverter circuit comprises a half-bridge inverter.

12. An instant-start ballast for driving a plurality of gas discharge lamps, said instant start ballast comprising:
   an inverter circuit for producing an AC signal from a received DC signal;
   a first resonant tank circuit for receiving the AC signal from the inverter circuit and producing a first output voltage;
   a second resonant tank circuit for receiving the AC signal from said inverter circuit and producing a second output voltage; and
   a microprocessor and a resistor connected to combine said first and said second output voltages, wherein the microprocessor functions to monitor said combined voltage and control said first output voltage and said second output voltage based upon said monitored voltage.

13. The instant-start ballast of claim 12 wherein said inverter further comprises a half-bridge inverter.

14. The instant-start ballast of claim 12 wherein said first and said second resonant tank circuits each comprise a series connection of a tank inductor and a tank capacitor.

15. The instant-start ballast of claim 12 wherein each resonant tank circuit is configured to drive at least two gas discharge lamps.

16. The instant-start ballast of claim 12 wherein each resonant tank circuit includes a tank capacitor and wherein a voltage across each tank capacitor is monitored to determine if a lamp is connected to said outputs of both said first tank resonant circuit and said second tank resonant circuit.

17. The instant-start ballast of claim 16 wherein an ignition signal is produced by said ballast only if said monitored voltage indicates that a lamp is connected to both said first and said second tank resonant circuits.

* * * * *